United States Patent
Johnson et al.

(10) Patent No.: US 12,367,400 B2
(45) Date of Patent: Jul. 22, 2025

(54) SYSTEM AND METHOD FOR COMPACT TREE REPRESENTATION FOR MACHINE LEARNING

(71) Applicant: PAYPAL, INC., San Jose, CA (US)

(72) Inventors: Raoul Christopher Johnson, Scottsdale, AZ (US); Omri Moshe Lahav, Carmiel (IL); Michael Dymshits, Holit (IL); David Tolpin, Ashdod (IL)

(73) Assignee: PAYPAL, INC., San Jose, CA (US)

( * ) Notice: Subject to any disclaimer, the term of this patent is extended or adjusted under 35 U.S.C. 154(b) by 1023 days.

(21) Appl. No.: 17/361,316

(22) Filed: Jun. 28, 2021

(65) Prior Publication Data
US 2022/0058493 A1 Feb. 24, 2022

Related U.S. Application Data

(63) Continuation of application No. 15/726,166, filed on Oct. 5, 2017, now Pat. No. 11,049,021.

(51) Int. Cl.
*G06N 5/02* (2023.01)
*G06F 16/22* (2019.01)
*G06N 20/00* (2019.01)

(52) U.S. Cl.
CPC ........... *G06N 5/02* (2013.01); *G06F 16/2246* (2019.01); *G06N 20/00* (2019.01)

(58) Field of Classification Search
CPC ....... G06N 5/02; G06N 20/00; G06F 16/2246
See application file for complete search history.

(56) References Cited

U.S. PATENT DOCUMENTS

| | | | |
|---|---|---|---|
| 6,646,572 B1 | 11/2003 | Brand | |
| 9,501,749 B1 | 11/2016 | Narsky | |
| 10,423,408 B2 | 9/2019 | Baset et al. | |
| 10,521,458 B1 | 12/2019 | Batruni | |
| 2004/0267770 A1 | 12/2004 | Lee | |
| 2009/0037491 A1 | 2/2009 | Cachin et al. | |
| 2009/0307213 A1 | 12/2009 | Deng et al. | |
| 2015/0324398 A1 | 11/2015 | Xiao et al. | |
| 2015/0324403 A1* | 11/2015 | Xiao | G06F 16/21 707/722 |
| 2016/0092779 A1 | 3/2016 | Werth | |

(Continued)

FOREIGN PATENT DOCUMENTS

EP 0598357 A1 5/1994

OTHER PUBLICATIONS

Messmer, Bruno T., and Horst Bunke. "A decision tree approach to graph and subgraph isomorphism detection." Pattern recognition 32.12 (1999): 1979-1998. (Year: 1999).*

(Continued)

*Primary Examiner* — Kevin W Figueroa
(74) *Attorney, Agent, or Firm* — HAYNES AND BOONE, LLP

(57) ABSTRACT

Aspects of the present disclosure involve systems, methods, devices, and the like for generating compact tree representations applicable to machine learning. In one embodiment, a system is introduced that can retrieve a decision tree structure to generate a compact tree representation model. The compact tree representation model may come in the form of a matrix design to maintain the relationships expressed by the decision tree structure.

20 Claims, 6 Drawing Sheets

| | A | B | C | D | E |
|---|---|---|---|---|---|
| A | 0 | 2 | 3 | 2 | 0 |
| B | 0 | 0 | 0 | 0 | 1 |
| C | 0 | 1 | 0 | 0 | 3 |
| D | 0 | 0 | 0 | 0 | 1 |
| E | 0 | 0 | 0 | 0 | 0 |

(56) References Cited

U.S. PATENT DOCUMENTS

2016/0371489 A1* 12/2016 Puri ..................... G06F 16/254
2018/0081880 A1* 3/2018 Kennedy ........... G06F 16/24578

OTHER PUBLICATIONS

Brownlee J., "Classification and Regression Trees for Machine Learning", [Online], Machine Learning Algorithms, retrieved on Jun. 7, 2017, Retrieved from the Internet: URL: http://machinelearningmastery.com/classificationandregressiontreesformachinelearning/, Apr. 8, 2016, 15 pages.

Dietterich T.G., "An Experimental Comparison of Three Methods for Constructing Ensembles of Decision Trees: Bagging, Boosting, and Randomization" [Online] Machine Learning 40, pp. 139-157, Retrieved on Jun. 7, 2017, from the Internet, URL: https://link.springer.com/article/10.1023%2FA%3A1007607513941?LI=true, 2000, 19 pages.

Tong H., et al., "GBASE: A Scalable and General Graph Management System", 2011, pp. 1091-1099.

Wang J., "Learning Hash for Indexing Big Data—A Survey", [Online], Proceedings of the IEEE retrieved on Jun. 7, 2017, Retrieved from the Internet: URL: http://ieeexplore.ieee.org/document/7360966/, Sep. 17, 2015, 22 pages.

Wu K, et al., "Network Classification Using Adjacency Matrix Embeddings and Deep Learning", IEEE/ACM International Conference on Advances in Social Networks Analysis and Mining (ASONAM), 2016, pp. 299-306.

Zhu J. et al. "Machine Learning: Decision Trees", [PDF], retrieved Online on Jun. 17, 2017. Retrieved from the Internet: URL: http://www.cs.cmu.edu/-awm/tutorials.

* cited by examiner

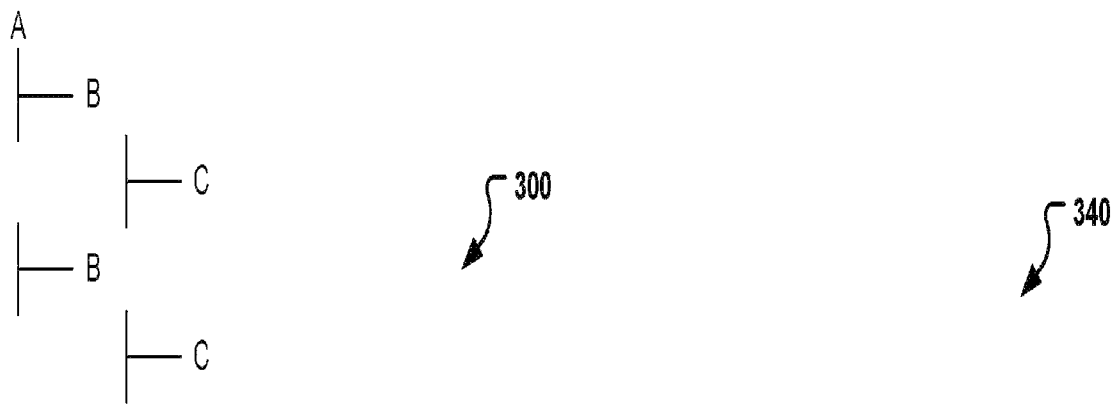
FIG. 3A
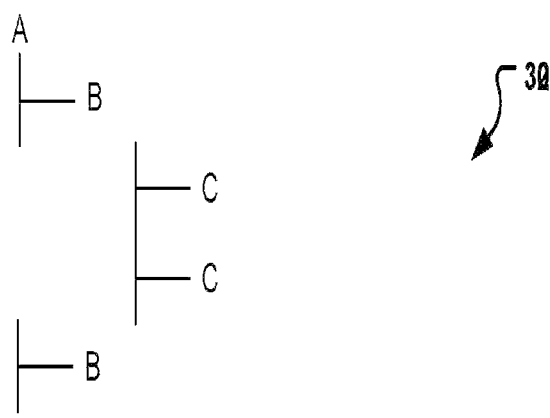
FIG. 3B
FIG. 3C

SYSTEM AND METHOD FOR COMPACT TREE REPRESENTATION FOR MACHINE LEARNING

RELATED APPLICATIONS

This application is a continuation of U.S. application Ser. No. 15/726,166, filed Oct. 5, 2017, which is hereby incorporated by reference in its entirety.

TECHNICAL FIELD

The present disclosure generally relates to machine learning in communication devices, and more specifically, to decision tree structures applicable to machine learning in communication devices.

BACKGROUND

Nowadays with the evolution and proliferation of electronics, information is constantly being collected and processed. In some instances, the data can become so large that traditional data processing applications may be inadequate for such processing and analyzing. As such, academia and industry have developed numerous techniques for analyzing the data including machine learning, A/B testing, and natural language processing. Machine learning in particular, has received a lot of attention due to its ability to learn and recognize patterns using algorithms that can learn from and make predictions from the data. An algorithm that is commonly used for making predictions includes a prediction model that uses decision tree learning. Decision tree learning, uses tree like graphing (commonly termed decision trees) to map observations, decisions, and outcomes. Decision trees however, transmitted in their native form, may be too large and variable, making them difficult for use in machine learning. Thus, it would be beneficial to create a system that can generate a compact tree representation applicable to machine learning.

BRIEF DESCRIPTION OF THE FIGURES

FIGS. 3A-3C illustrate block diagrams of another exemplary decision tree structure and corresponding compact tree representation.

Figure 1:
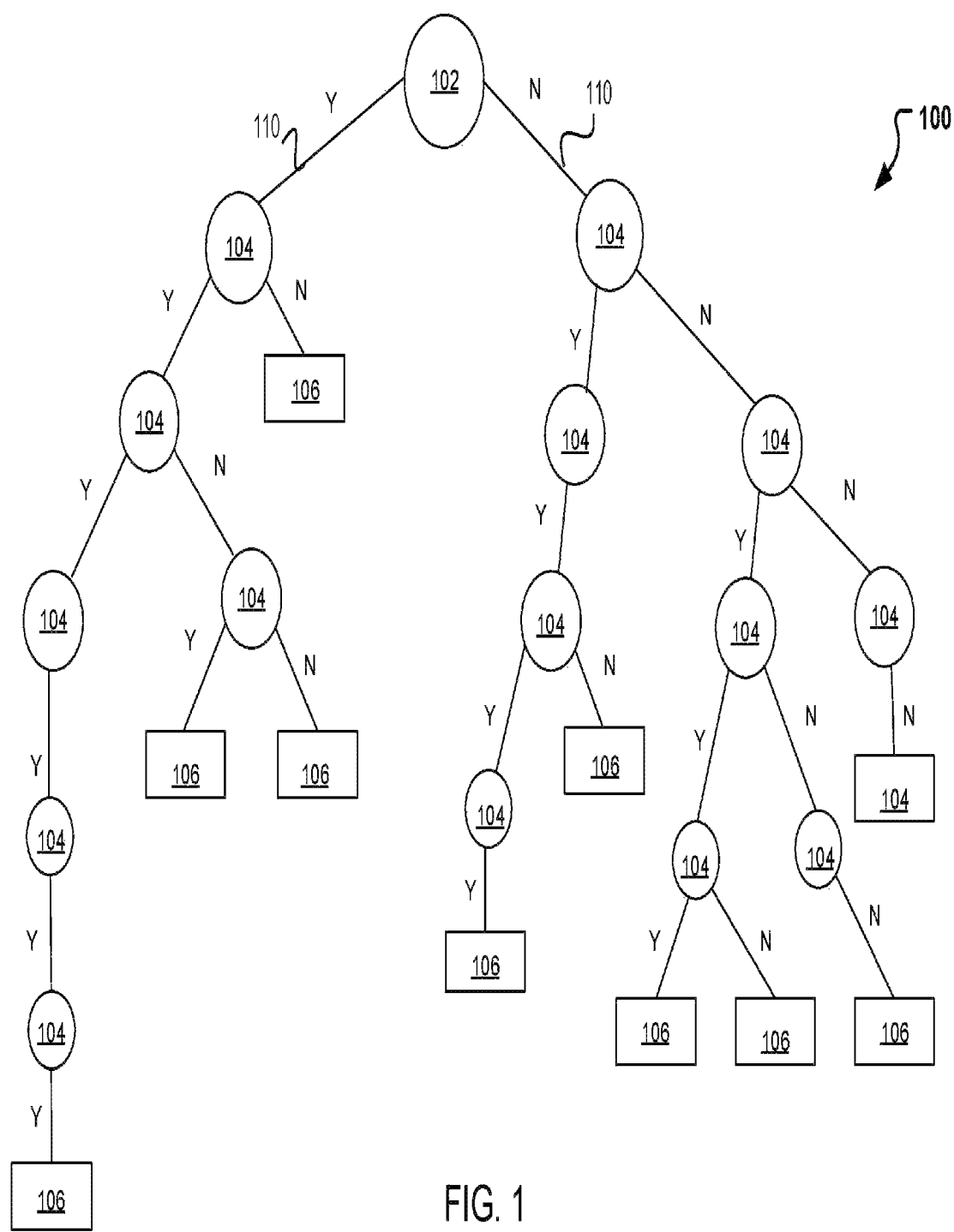
FIG. 1 illustrates a decision tree structure applicable to machine learning.

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Aspects of the present disclosure involve systems, methods, devices, and the like for generating compact tree representations applicable to machine learning. In one embodiment, a system is introduced that can retrieve a decision tree structure to generate a compact tree representation model. The compact tree representation model may come in the form of a matrix design to maintain the relationships expressed by the decision tree structure. In another embodiment, the compact tree representation model is presented to a system for machine learning implementation in string format, where the string describes the cells within the matrix.

Machine learning is a technique that has gain popularity in the big data space for its capacity to process and analyze large amounts of data. In particular, machine learning has grown in popularity due to its ability to learn and recognize patterns found in the data. Various algorithms exist that may be used for learning and predicting in machine learning. The algorithms may include, but are not limited to support vector machines, artificial neural networks, Bayesian networks, decision tree learning, etc. Decision tree learning is one commonly used algorithm that uses decision trees to map observations, decisions, and outcomes.

The decision trees can grow fairly large as observations and relationships are mapped and expanded to arrive at a conclusion. FIG. 1 illustrates a decision tree structure applicable to machine learning. In particular, FIG. 1 provides an exemplary decision tree 100 illustrating the mapping of relationships and observations to arrive at a conclusion(s). Generally, decision trees can be described in terms of three components, a root node, leaves, and branches. The root node can be the starting point of the tree. As illustrated in FIG. 1, this can include root 102, the top most node which indicates the start of the decision tree. In most instances, the root 102 may be used to indicate the main idea or main criteria that should be met to arrive at a decision.

Next, once the main criteria or root 102 has been established, branches extended from root node 102 can be used to indicate the various options available from the root 102. For example, the root may include a criteria which can have one of two outcomes which can be answered by a "yes" or "no." FIG. 1, illustrates such example, where the root 102 provides two possible options indicated by the two branches 110 extending from the root 102. The branches can then attach to other (child) nodes 104 which are related to the root 102. Again branches 110 may then be extended from each node as more decisions (e.g. nodes 104) and possible outcomes (e.g., branches 110) exist. The decision tree 100 may continue to grow as more and more decisions are made until a final outcome is reached and represented by a leaf 106. As illustrated in FIG. 1, one or more leafs 106 are possible from a single node and in some instances, the leafs may appear as early as the second node 104, while in other instances, the nodes 104 may extend several layers before arriving at a leaf 106.

As illustrated, the decision tree 100 may grow and can extend significantly as more data is received and decisions are to be made. FIG. 1 is for illustrative purposes only and more or less nodes, branches, and leaves may be added. In addition, FIG. 1 is designed to illustrate the intricacies of a decision tree and how quickly, the tree may become too large and difficult for use with machine learning.

In line with the knowledge that decision trees may grow too large for processing, a first embodiment is presented which introduces a system and method for compact decision tree representation. In particular, a system is introduced which can generate a compact tree representation which can transform a decision tree structure (e.g., decision tree 100) into a compact matrix which can be efficiently transmitted at a scale that is more suitable for machine learning and artificial intelligence (AI) tasks.

Figures 2A, 2B:
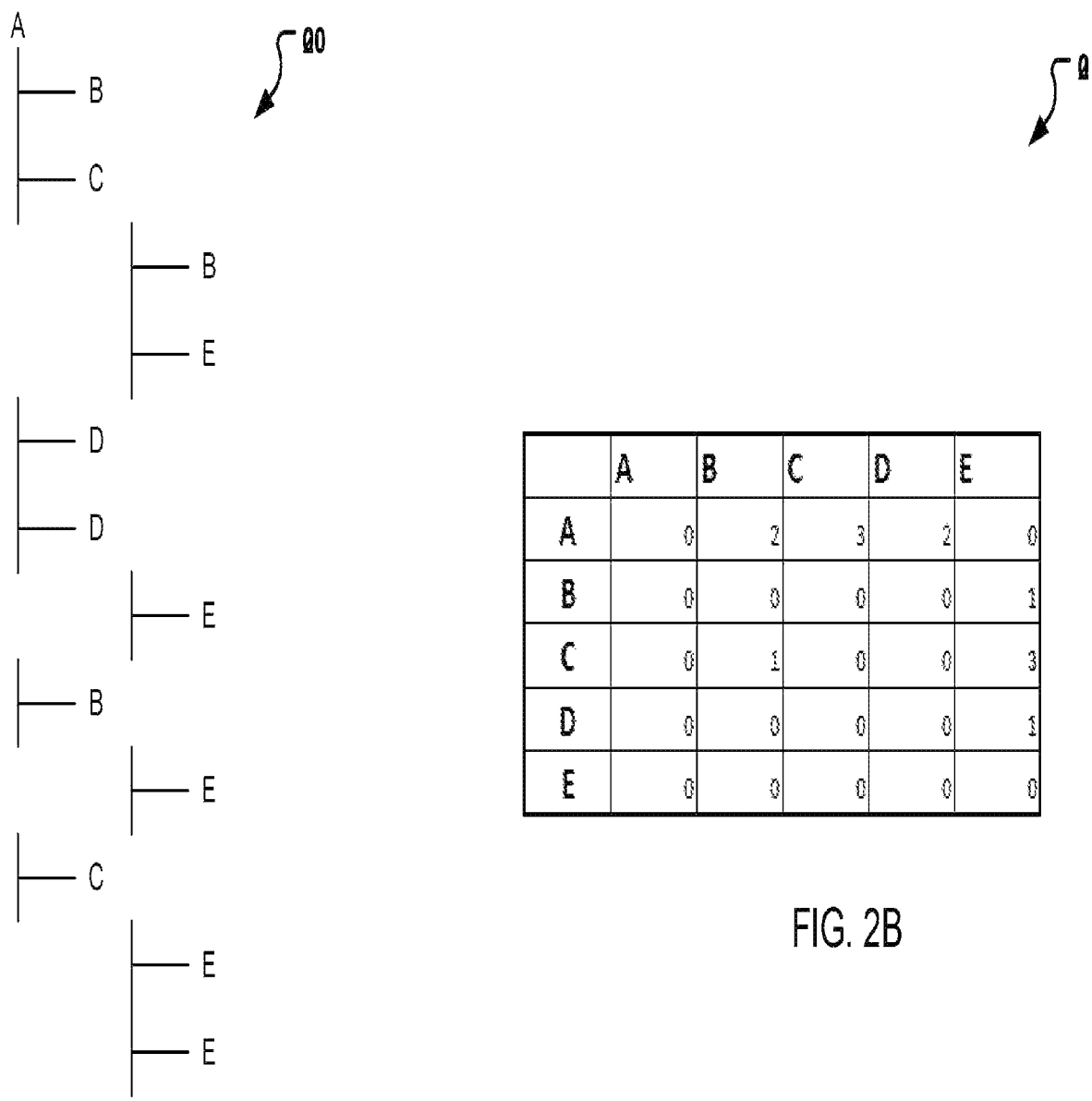
FIGS. 2A-2B illustrate block diagrams of an exemplary decision tree structure and a corresponding compact tree representation.

FIGS. 2A-2B illustrate block diagrams of an exemplary decision tree structure and a corresponding compact tree representation. Particular FIG. 2A illustrates a decision tree 200 whose root node is A with various branches extending to the various decisions possible (B-E).

As illustrated decision tree 200 has several layers that like decision tree 100 can quickly grow to become too large for processing. As a solution, compact tree representation 220 is introduced as a solution. Compact tree representation 220 may be in the form of a matrix. In one embodiment, compact tree representation (CTR) 220 is an adjacency matrix. An adjacency matrix is a square matrix which whose elements can be compacted in a triangular format or derivative of it. These unique properties of the adjacency matrix provide a compact means for succinctly representing data graphs using less storage space. That is to say, the structure of the matrix maintains essential relationship information present in typical tree structure 200 while presenting the information in a matrix.

In CTR 220, the fact that machine learning and AI tasks do not necessitate a visual tree structure is leveraged by presenting a solution that does not use the structure. For example, by transforming tree structure 200 into a variant of an adjacency matrix, it is possible to embed the information in decision tree 200 into the CTR matrix 220. The embedding, maps the parent-child (ex., root 102 to node 104) relationship of a tree structure to a row-column matrix structure. In one embodiment, each row represents the parent while each column represents the child. The cells can then each represent the number of times the parent called the child.

To illustrate this mapping, CTR 220 is presented which maps tree structure 200. CTR 220 begins with the top most cell as the root node 102. Here, since the node does not call itself, no value is input in the cell. Next, turning to FIG. 2A, as illustrated on the first set of nodes, branches stem from element A to elements B, C, and D. Notice that root node A, branches out to element B two times, element C three times and element D two times. In CTR 220 of FIG. 2B, this corresponds to the first row A with column B, column C and column D, such that the corresponding cells contain a 2, 3, and 2 respectively. Similarly, Nodes B, C, and D, of CTR 200 branch out to other elements (namely B and E in this example). Thus, rows B, C, and D, are illustrated with branches extending to elements B and E. Accordingly, columns B and E now contain a numerical indication demonstrating the number of times the parent node (B, C, and D) extend to the child nodes (B and E).

Note that FIGS. 2A and 2B are for exemplary purposes only and other tree structures or graph structures are possible. In addition, note that the compact tree structure may include compressed sparse row (CSR) and/or compressed sparse column (CSC) in order to provide an even more compact tree representation addition, note that while an adjacency matrix is use in this embodiment, any other matrix type is possible such as but not limited to, a Laplacian matrix, a degree matrix, stiffness matrix, etc. Also note, the compact tree representation is not limited to matrix representation and other compact representations are possible. For example, a Base64 encoding may be used.

FIGS. 3A-3C illustrate block diagrams of other exemplary decision tree structures and corresponding compact tree representation. In particular, FIGS. 3A-3C provide two distinct tree structures which are represented by a common tree representation. As will be illustrated the use of compact tree representation enables the ability to provide relationship information for numerous tree structures 102 using a single CTR matrix. Turning to FIG. 3A for example, is a tree structure 300 with a root node A which includes 2 possible outcomes represented by elements B which can then each branch into a single element C. Turning to FIG. 3C, consider CTR 340 which can represent a compact solution to decision tree 300. Notice that in CTR 340, indeed the cell corresponding to row A, column B contains a 2 representing the two nodes/possible outcomes B stemming from root A. Similarly, cell at row B, column C includes a 2 corresponding to the 2 decisions output from each element B of decision tree 302.

Now turning to decision tree 320, FIG. 3B a second tree is illustrated including a root node A which branches out to two elements, B. From element B a branch extends to decision C. Using CTR 340, the same matrix representation may be used to describe decision tree 340. Again, cell AB=2 corresponding to row A, column B is used to represent the two decision Bs, while cell BC=2 indicates the outcome C. Therefore, although two distinct decision trees are presented (e.g., decision trees 300, 320), the relationship between the elements can be identified and represented by a single CTR 340.

Compared to conventional systems, a typical decision tree can be about 4 k bytes. However, if CTR is used, the same tree can be represented in about 200 bytes. This illustrates that a decision tree can be represented using CTR that are about 5% the size of the original decision tree. Thus, as the number of nodes used in the decision tree becomes large, the savings can become quite significant.

Note that generally, the process tree of a single machine is presented as a "tree of strings." Thus, the process of monitoring the status of multiple machines entails the use of many trees of strings. To monitor the status, the general approach necessitates the use of machine learning to determine similarities and/or measure distances between the process representations. To calculate such differences is not trivial and as such the use of a matrices allows processing of a large amount of data for matrix distance computations (e.g., norm, $L\_1$, $L\_2$, etc.), matrix similarities, and for use in preprocessing such as with deep convolution networks and/or recurrent neural networks.

To illustrate such use, consider a system (e.g., payment provider—PayPal), which has many computers, servers, etc. running simultaneously to get a payment processed, a transaction recorded, a record reconciled, etc. This type of system may have many processes that are often running and it is often necessary to obtain detailed information about the processes. However, the information collected that provides the details is often very large, and techniques that include decision trees and machine learning are often implemented. The decision trees, as illustrated in FIG. 1, may become too large thus, the decision trees may be converted into CTRs which may be used, maintain the relationship information while decreasing the data used for machine learning substantially. That is to say, the number of times services or types of services called is maintained.

Thus, with regards to the system in the example, numerous machines may be running, and each machine is running a number of processes (e.g., java, cron, init, etc). The user may be interested in understanding whether the machines, based on the processes being run, may be clustered or differentiated. To do so a script may be run to obtain a listing of the various processes. However, these process lists may be of varying length and the information too larger to process coherently. Thus, representing the lists in a compact tree representation, provides an efficient way to obtain the process information such that a single string may be used and input into an appropriate machine learning model, as opposed to a large complex decision tree.

Figure 4:
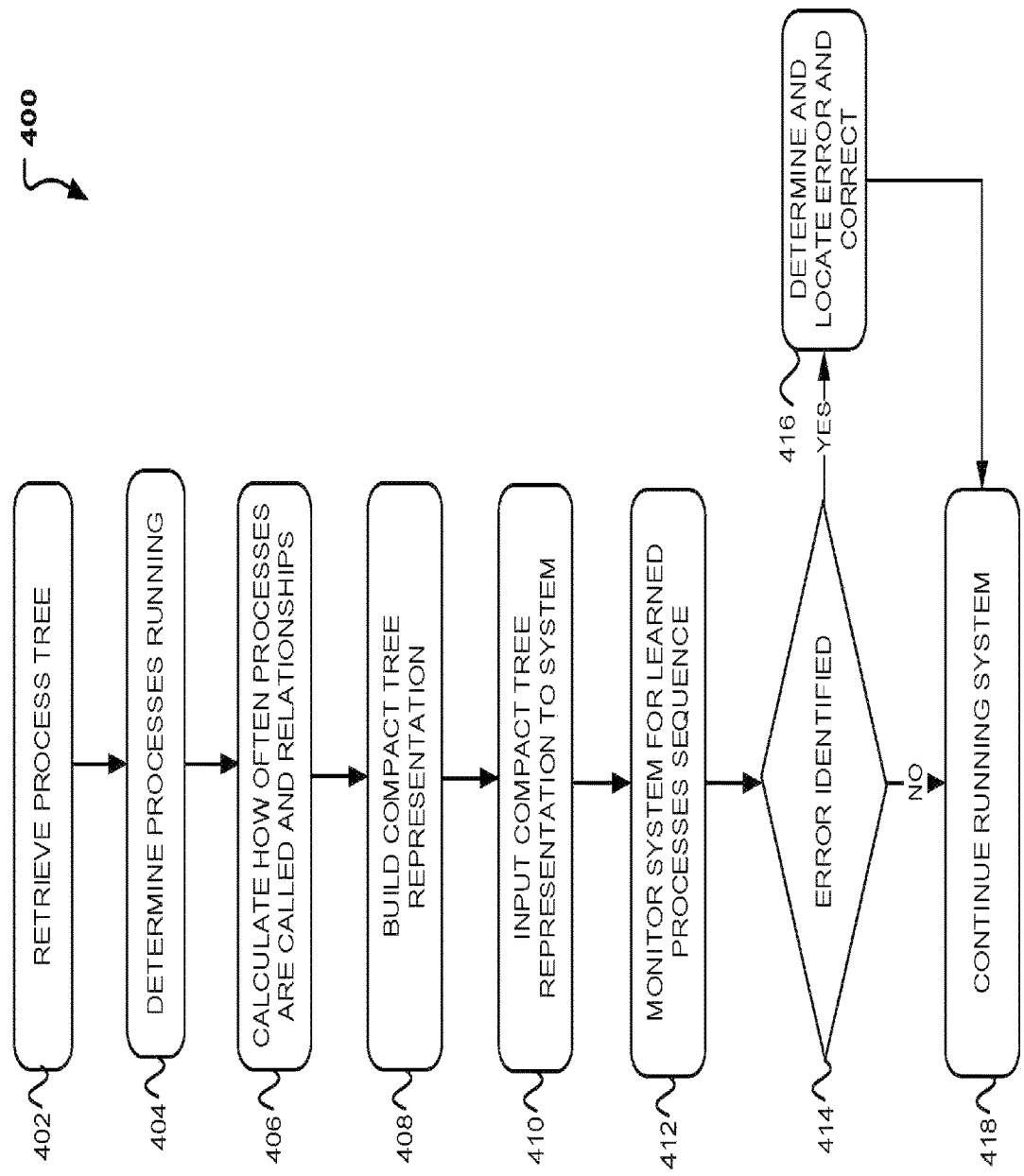
FIG. 4 illustrates a flow diagram illustrating operations for generating and using a compact tree representation applicable to machine learning in a communication device.
Figure 5:
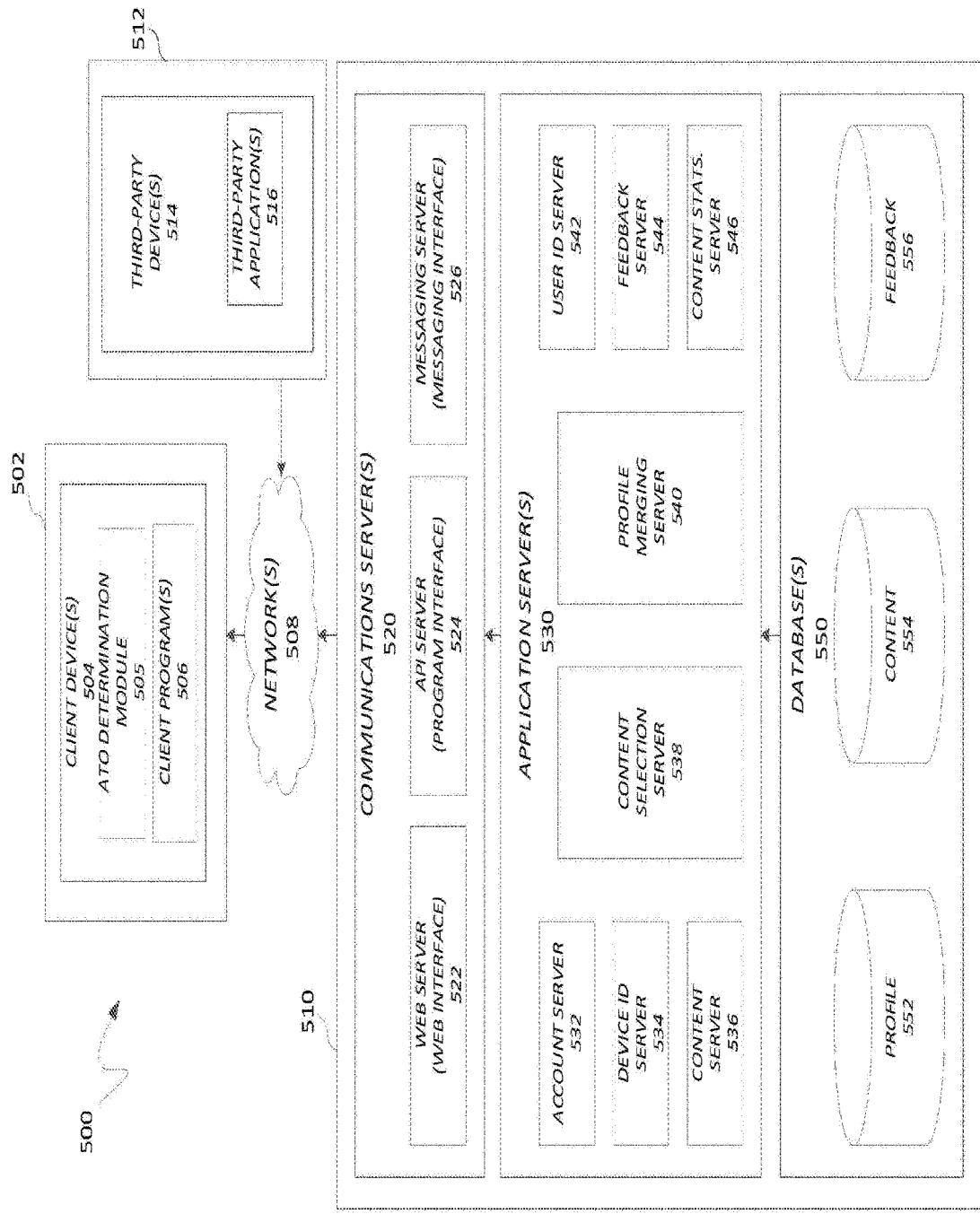
FIG. 5 illustrates a block diagram of a system for generating compact tree representations applicable to machine learning.

To illustrate how compact tree representation may be generated and used, FIG. 4 is introduced which illustrates example process 400 that may be implemented on a system, such as system 500 in FIG. 5. In particular, FIG. 4 illustrates a flow diagram illustrating how to generate and use a compact tree representation applicable to machine learning in a communication device or system. According to some embodiments, process 400 may include one or more of operations 402-418, which may be implemented, at least in part, in the form of executable code stored on a non-transitory, tangible, machine readable media that, when run on one or more hardware processors, may cause a system to perform one or more of the operations 402-418.

Process 400 may begin with operation 402, where data is retrieved. As previously indicated, large data is constantly collected by devices that oftentimes needs to be organized and analyzed. Machine learning is a technique that is often used for such analytics. Oftentimes, the large data is organized using decision tree structures which can be used by the machine learning algorithms to extract the information of interest. In process 400, the data has been organized in decision tree format and retrieved for processing and extracting the information of interest.

An obstacle that may be encountered as the data becomes significant and consequently the tree structures is the vast amount of information (in tree structure format) that needs to be provided to the machine that enables the machine learning processes. At operation 404 the tree structures are analyzes to determine the nodes on the tree structure. That is to say, the processes (or other information) is content on the tree structure is determined. For example, as indicate above, the processes can be multiple machines running java scripts, inits, crons, etc. It may then be useful which processes are running. Note that in some instances, the information retrieved may come in the form of a text file which may include a list of the processes running on the one or more systems (machines). In addition, the list may be obtained in the order that it would be called on a decision tree (e.g., A called B and B called C, etc.).

Once the processes are identified, process 400 continues to operation 406 where the relationships between the nodes (e.g., processes) and the frequency between them is determined. This operation corresponds to the number of times each element is called and when it is called in relation to what other element (e.g., node A branches to nodes B and C and/or node B branches out to nodes C and D). In other words, operation 406 may include computing how many times each service is called (e.g., how many times does service A call service B and service C, etc.).

As the relationships and the quantities are known, a compact tree may be built. Referring to FIGS. 2-3, in one embodiment, the compact tree representation comes in the form of a matrix, whose elements indicate the services and the times the services are called. That is to say, a matrix is generated from the information obtained at operation 406 to build a matrix which maintains those relationships.

The matrix can then be represented by a simple string of numbers where the location of each number is representative of a cell on the CTR matrix. For example, referring to FIGS. 3A-3C, decision trees 300 and 320 can now both be described by a simple 9 element string (e.g., 020002000) corresponding to the 9 elements on the matrix. The string is then input into the system for applicable machine learning analysis at operation 410.

Once input and processed by the system, learning will occur and patterns may be identified that will be used in monitoring system. Note that in some instances, the system may include the machine performing the monitoring. In one embodiment, the system includes the data sources which can include one or more machines from which the data is retrieved, organized and monitored. In such instances, the data sources may include the one or more machines running the processes and/or services and distinct from the system compacting and monitoring the information.

In processing the information, patterns may be identified which can be the information monitored. That is to say, a sequence is what is monitored (e.g., a first service calls a second service and then that second service calls a third and fifth service.) such that if the sequence does not repeat, an error may be present. At operation 414, the sequences coming in are checked for errors. If an error is present or the sequence does not arrive, then process 400 can continue to operation 416 where the type of error and location (e.g. which machine and process) are identified and corrected. Alternatively, if the sequence expected is received, then the system continues running without correction at operation 418.

Note that other forms of monitoring may also exist. For example, once the sequence is known, then a single bit may be transmitted indicating no errors detected or nothing is transmitted unless an error is identified. Also note that the tree structures, matrices, and flow presented are for exemplary purposes and other methods, structures, and representations may be contemplated.

The processes and services may derived from other servers, machines, and/or datastructures within a system (e.g. a payment provider system). However, in some instances, the processes and services for monitoring and compacting using CTR for error detection may include transactions, authorizations, and records collected and applicable to user devices and merchants. That is to say, compact tree representation is applicable to various large data collection and analysis including, but not limited to data deriving from user devices, merchants, and payment providers, etc.

FIG. 5 illustrates, in block diagram format, an example embodiment of a computing environment adapted for implementing a system for determining a compact tree representation. As shown, a computing environment 500 may comprise or implement a plurality of servers and/or software components that operate to perform various methodologies in accordance with the described embodiments. Severs may include, for example, stand-alone and enterprise-class servers operating a server operating system (OS) such as a MICROSOFT® OS, a UNIX® OS, a LINUX® OS, or other suitable server-based OS. It may be appreciated that the servers illustrated in FIG. 4 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing environment 500 may include, among various devices, servers, databases and other elements, one or more clients 502 that may comprise or employ one or more client devices 504, such as a laptop, a mobile computing device, a tablet, a PC, a wearable device, desktop and/or any other computing device having computing and/or communications capabilities in accordance with the described embodiments. Client devices 504 may include a cellular telephone, smart phone, electronic wearable device (e.g., smart watch, virtual reality headset), or other similar mobile devices that a user may carry on or about his or her person and access readily. Alternatively, client device 504 can include one or more machines processing, authorizing, and performing transactions that may be monitored.

Client devices 504 generally may provide one or more client programs 506, such as system programs and application programs to perform various computing and/or communications operations. Some example system programs may include, without limitation, an operating system (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Some example application programs may include, without limitation, a web browser application, messaging applications (e.g., e-mail, IM, SMS, MIMS, telephone, voicemail, VoIP, video messaging, internet relay chat (IRC)), contacts application, calendar application, electronic document application, database application, media application (e.g., music, video, television), location-based services (LBS) applications (e.g., GPS, mapping, directions, positioning systems, geolocation, point-of-interest, locator) that may utilize hardware components such as an antenna, and so forth. One or more of client programs 506 may display various graphical user interfaces (GUIs) to present information to and/or receive information from one or more users of client devices 504. In some embodiments, client programs 506 may include one or more applications configured to conduct some or all of the functionalities and/or processes discussed below.

As shown, client devices 504 may be communicatively coupled via one or more networks 508 to a network-based system 510. Network-based system 510 may be structured, arranged, and/or configured to allow client 502 to establish one or more communications sessions between network-based system 510 and various computing devices 504 and/or client programs 506. Accordingly, a communications session between client devices 504 and network-based system 510 may involve the unidirectional and/or bidirectional exchange of information and may occur over one or more types of networks 508 depending on the mode of communication. While the embodiment of FIG. 5 illustrates a computing environment 500 deployed in a client-server operating relationship, it is to be understood that other suitable operating environments, relationships, and/or architectures may be used in accordance with the described embodiments.

Data communications between client devices 504 and the network-based system 510 may be sent and received over one or more networks 508 such as the Internet, a WAN, a WWAN, a WLAN, a mobile telephone network, a landline telephone network, personal area network, as well as other suitable networks. For example, client devices 504 may communicate with network-based system 510 over the Internet or other suitable WAN by sending and or receiving information via interaction with a web site, e-mail, IM session, and/or video messaging session. Any of a wide variety of suitable communication types between client devices 504 and system 510 may take place, as will be readily appreciated. In particular, wireless communications of any suitable form may take place between client device 504 and system 510, such as that which often occurs in the case of mobile phones or other personal and/or mobile devices.

In various embodiments, computing environment 500 may include, among other elements, a third party 512, which may comprise or employ third-party devices 514 hosting third-party applications 516. In various implementations, third-party devices 514 and/or third-party applications 516 may host applications associated with or employed by a third party 512. For example, third-party devices 514 and/or third-party applications 516 may enable network-based system 510 to provide client 502 and/or system 510 with additional services and/or information, such as merchant information, data communications, payment services, security functions, customer support, and/or other services, some of which will be discussed in greater detail below. Third-party devices 514 and/or third-party applications 516 may also provide system 510 and/or client 502 with other information and/or services, such as email services and/or information, property transfer and/or handling, purchase services and/or information, and/or other online services and/or information and other processes and/or services that may be processes and monitored by system 510.

In one embodiment, third-party devices 514 may include one or more servers, such as a transaction server that manages and archives transactions. In some embodiments, the third-party devices may include a purchase database that can provide information regarding purchases of different items and/or products. In yet another embodiment, third-party severs 514 may include one or more servers for aggregating consumer data, purchase data, and other statistics.

Network-based system 510 may comprise one or more communications servers 520 to provide suitable interfaces that enable communication using various modes of communication and/or via one or more networks 508. Communications servers 520 may include a web server 522, an API server 524, and/or a messaging server 526 to provide interfaces to one or more application servers 530. Application servers 530 of network-based system 510 may be structured, arranged, and/or configured to provide various online services, merchant identification services, merchant information services, purchasing services, monetary transfers, checkout processing, data gathering, data analysis, and other services to users that access network-based system 510. In various embodiments, client devices 504 and/or third-party devices 514 may communicate with application servers 530 of network-based system 510 via one or more of a web interface provided by web server 522, a programmatic interface provided by API server 524, and/or a messaging interface provided by messaging server 526. It may be appreciated that web server 522, API server 524, and messaging server 526 may be structured, arranged, and/or configured to communicate with various types of client devices 504, third-party devices 514, third-party applications 516, and/or client programs 506 and may interoperate with each other in some implementations.

Web server 522 may be arranged to communicate with web clients and/or applications such as a web browser, web browser toolbar, desktop widget, mobile widget, web-based application, web-based interpreter, virtual machine, mobile applications, and so forth. API server 524 may be arranged to communicate with various client programs 506 and/or a third-party application 516 comprising an implementation of API for network-based system 510. Messaging server 526 may be arranged to communicate with various messaging clients and/or applications such as e-mail, IM, SMS, MMS, telephone, VoIP, video messaging, IRC, and so forth, and messaging server 526 may provide a messaging interface to enable access by client 502 and/or third party 512 to the various services and functions provided by application servers 530.

Application servers 530 of network-based system 510 may be a server that provides various services to clients including, but not limited to, data analysis, geofence management, order processing, checkout processing, and/or the like. Application server 530 of network-based system 510 may provide services to a third party merchants such as real time consumer metric visualizations, real time purchase information, and/or the like. Application servers 530 may include an account server 532, device identification server 534, payment server 536, queue analysis server 538, purchase analysis server 540, geofence server 452, notification server 454, and/or checkout server 546. These servers, which may be in addition to other servers, may be structured and arranged to configure the system for monitoring queues and identifying ways for reducing queue times.

Application servers 530, in turn, may be coupled to and capable of accessing one or more databases 550 including a geofence database 452, an account database 454, transaction database 456, and/or the like. Databases 450 generally may store and maintain various types of information for use by application servers 430 and may comprise or be implemented by various types of computer storage devices (e.g., servers, memory) and/or database structures (e.g., relational, object-oriented, hierarchical, dimensional, network) in accordance with the described embodiments.

Figure 6:
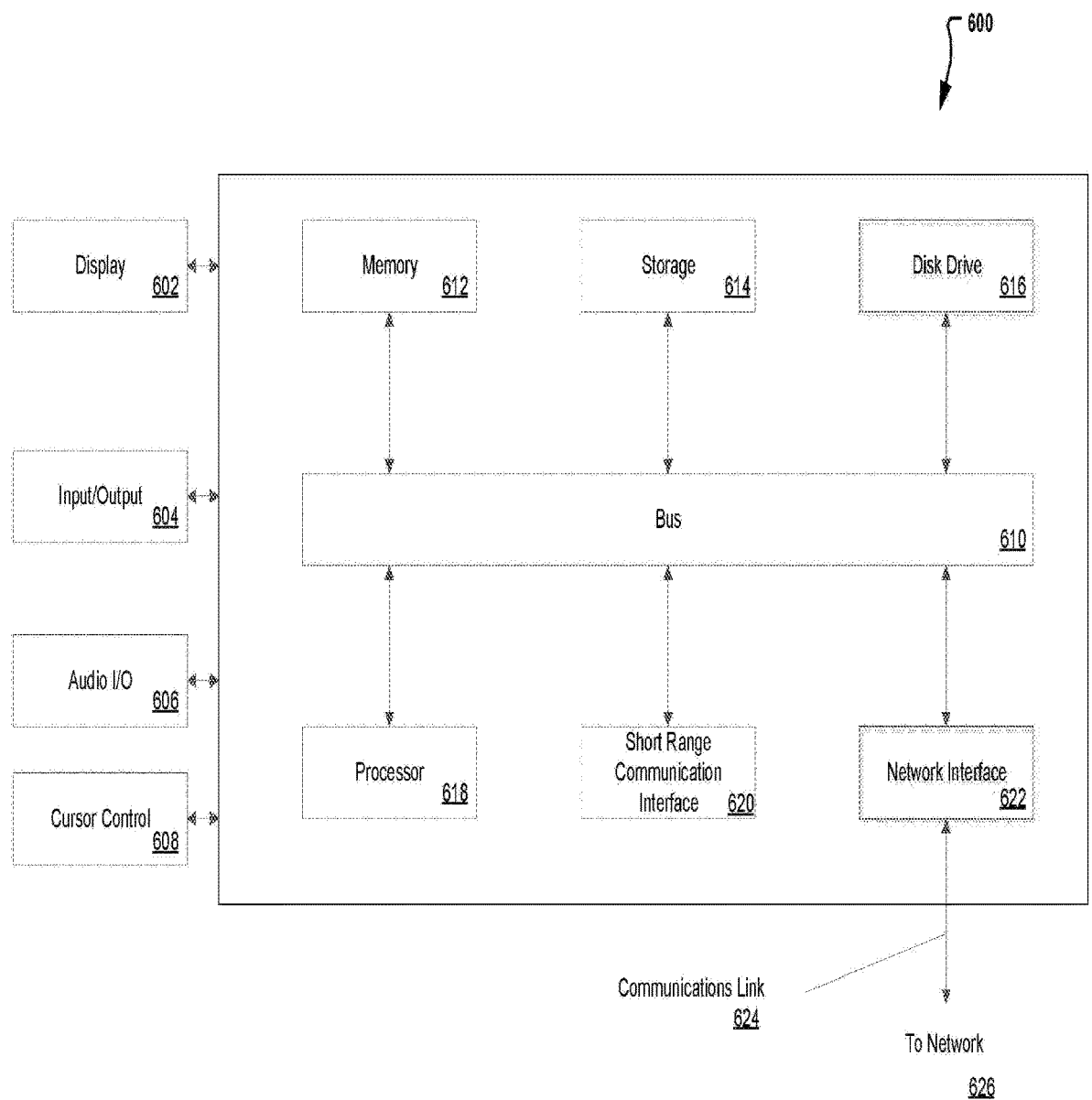
FIG. 6 illustrates an example block diagram of a computer system suitable for implementing one or more devices of the communication systems of FIGS. 1-5.

FIG. 6 illustrates an example computer system 600 in block diagram format suitable for implementing on one or more devices of the system in FIGS. 1-5. In various implementations, a device that includes computer system 600 may comprise a personal computing device (e.g., a smart or mobile device, a computing tablet, a personal computer, laptop, wearable device, PDA, etc.) that is capable of communicating with a network 626. A service provider and/or a content provider may utilize a network computing device (e.g., a network server) capable of communicating with the network. It should be appreciated that each of the devices utilized by users, service providers, and content providers may be implemented as computer system 600 in a manner as follows.

Additionally, as more and more devices become communication capable, such as new smart devices using wireless communication to report, track, message, relay information and so forth, these devices may be part of computer system 600. For example, windows, walls, and other objects may double as touch screen devices for users to interact with. Such devices may be incorporated with the systems discussed herein.

Computer system 600 may include a bus 610 or other communication mechanisms for communicating information data, signals, and information between various components of computer system 600. Components include an input/output (I/O) component 604 that processes a user action, such as selecting keys from a keypad/keyboard, selecting one or more buttons, links, actuatable elements, etc., and sending a corresponding signal to bus 610. I/O component 604 may also include an output component, such as a display 602 and a cursor control 608 (such as a keyboard, keypad, mouse, touchscreen, etc.). In some examples, I/O component 604 other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 618, which may be a micro-controller, digital signal processor (DSP), or other processing component, that processes these various signals, such as for display on computer system 600 or transmission to other devices over a network 626 via a communication link 624. Again, communication link 624 may be a wireless communication in some embodiments. Processor 618 may also control transmission of information, such as cookies, IP addresses, images, and/or the like to other devices.

Components of computer system 600 also include a system memory component 614 (e.g., RAM), a static storage component 614 (e.g., ROM), and/or a disk drive 616. Computer system 600 performs specific operations by processor 618 and other components by executing one or more sequences of instructions contained in system memory component 612 (e.g., for engagement level determination). Logic may be encoded in a computer readable medium, which may refer to any medium that participates in providing instructions to processor 618 for execution. Such a medium may take many forms, including but not limited to, non-volatile media, volatile media, and/or transmission media. In various implementations, non-volatile media includes optical or magnetic disks, volatile media includes dynamic memory such as system memory component 612, and transmission media includes coaxial cables, copper wire, and fiber optics, including wires that comprise bus 610. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, hard disk, magnetic tape, any other magnetic medium, CD-ROM, any other optical medium, RAM, PROM, EPROM, FLASH-EPROM, any other memory chip or cartridge, or any other medium from which a computer is adapted to read.

Components of computer system 600 may also include a short range communications interface 520. Short range communications interface 620, in various embodiments, may include transceiver circuitry, an antenna, and/or waveguide. Short range communications interface 620 may use one or more short-range wireless communication technologies, protocols, and/or standards (e.g., WiFi, Bluetooth®, Bluetooth Low Energy (BLE), infrared, NFC, etc.).

Short range communications interface 620, in various embodiments, may be configured to detect other devices (e.g., device 102, secondary user device 104, etc.) with short range communications technology near computer system 600. Short range communications interface 620 may create a communication area for detecting other devices with short range communication capabilities. When other devices with short range communications capabilities are placed in the communication area of short range communications interface 620, short range communications interface 620 may detect the other devices and exchange data with the other devices. Short range communications interface 620 may receive identifier data packets from the other devices when in sufficiently close proximity. The identifier data packets may include one or more identifiers, which may be operating system registry entries, cookies associated with an application, identifiers associated with hardware of the other device, and/or various other appropriate identifiers.

In some embodiments, short range communications interface 620 may identify a local area network using a short range communications protocol, such as WiFi, and join the local area network. In some examples, computer system 600 may discover and/or communicate with other devices that are a part of the local area network using short range communications interface 620. In some embodiments, short range communications interface 620 may further exchange data and information with the other devices that are communicatively coupled with short range communications interface 620.

In various embodiments of the present disclosure, execution of instruction sequences to practice the present disclosure may be performed by computer system 600. In various other embodiments of the present disclosure, a plurality of computer systems 600 coupled by communication link 624 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link 624 and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on the user and user device, however, a customer, a merchant, a service or payment provider may otherwise presented with tailored information. Thus, "user" as used herein can also include charities, individuals, and any other entity or person receiving information. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory storing instructions; and
a processor configured to execute the instructions to cause the system to perform operations that comprise:
retrieving a file including information associated with a decision tree structure, wherein the decision tree structure includes a plurality of branches interconnected to a plurality of nodes, wherein each of the plurality of branches represents a decision, wherein each of the plurality of nodes represents an outcome associated with the decision, and wherein the decision tree structure has a first electronic memory size;
analyzing the decision tree structure to determine the plurality of nodes on the decision tree structure;
determining, based on the analyzing, a relationship between the plurality of nodes of the decision tree structure;
generating, after the determining, a compact matrix representing the determined relationship between the plurality of nodes of the decision tree structure, wherein the compact matrix has a second electronic memory size less than the first electronic memory size;
converting the compact matrix into a string of numbers, wherein a location of each number of the string represents a cell on the compact matrix; and
performing a machine learning analysis at least in part by inputting the string of numbers into a machine learning model.

2. The system of claim 1, wherein the compact matrix comprises an adjacency matrix.

3. The system of claim 1, wherein the file is in a form of a text file including processes running the system.

4. The system of claim 1, wherein the determining includes determining a number of times a given node of the plurality of nodes is called and a relationship of the given node to another node of the plurality of nodes.

5. The system of claim 1, wherein the operations further comprise:
identifying, by the system, patterns associated with the string of numbers.

6. The system of claim 1, wherein the file is retrieved from a plurality of machines running processes in the system for compacting and monitoring the information associated with the decision tree structure.

7. The system of claim 6, wherein the monitoring includes identifying errors in a sequence received by the system from one or more external machines.

8. The system of claim 1, wherein:
the decision tree structure specifies a parent-child relationship among the plurality of nodes; and
the compact matrix is generated at least in part by mapping the parent-child relationship defined by the decision tree structure into a row-column structure of the compact matrix.

9. A method comprising:
accessing a decision tree structure that includes a plurality of nodes connected to a plurality of branches, wherein each branch of the plurality of branches corresponds to a binary decision, wherein each node of the plurality of nodes corresponds to an outcome associated with the binary decision, and wherein the decision tree structure has a first file size;
analyzing the decision tree structure to determine the plurality of nodes of the decision tree structure;
determining, based on the analyzing, a relationship between the plurality of nodes of the decision tree structure;
generating, after the determining, a compact matrix representing the determined relationship between the plurality of nodes of the decision tree structure, wherein the compact matrix has a second file size smaller than the first file size;
representing the compact matrix with a string of numbers, wherein a location of each number of the string is associated with a cell on the compact matrix; and
performing a machine learning analysis based on the string of numbers.

10. The method of claim 9, wherein the compact matrix comprises an adjacency matrix.

11. The method of claim 9, wherein the accessing comprises accessing a text file including processes running a system, and wherein the decision tree structure is a part of the text file.

12. The method of claim 9, wherein the determining includes determining a number of times a first node of the plurality of nodes is called and a relationship of the first node to another node of the plurality of nodes.

13. The method of claim 9, further comprising:
identifying patterns associated with the string of numbers.

14. The method of claim 9, wherein the decision tree structure is retrieved from a plurality of machines running processes in a system for compacting and monitoring information associated with the decision tree structure.

15. The method of claim 14, wherein the monitoring includes identifying errors in a sequence received by the system from one or more external machines.

16. The method of claim 9, wherein:
the decision tree structure specifies a parent-child relationship among the plurality of nodes; and
the compact matrix is generated at least in part by mapping the parent-child relationship defined by the decision tree structure into a row-column structure of the compact matrix.

17. A non-transitory machine readable medium having stored thereon machine readable instructions executable to cause a machine to perform operations comprising:
retrieving an electronic file including information associated with a decision tree structure that includes a plurality of nodes and a plurality of branches interconnecting the plurality of nodes, wherein each branch of the plurality of branches represents a "yes" or "no" decision, wherein each node of the plurality of nodes represents an outcome associated with the "yes" or "no" decision, and wherein the electronic file has a first size;
analyzing the decision tree structure to determine the plurality of nodes on the decision tree structure;
determining, based on the analyzing, a relationship between the plurality of nodes of the decision tree structure;
generating, based on the determined relationship between the plurality of nodes of the decision tree structure, a compact matrix having a second size less than the first size;
generating a string of numbers based on the compact matrix, wherein a location of each number of the string corresponds to a cell of the compact matrix; and
performing, at least in part using the string of numbers, a machine learning process.

18. The non-transitory machine readable medium of claim 17, wherein the operations further comprise:
identifying patterns associated with the string of numbers.

19. The non-transitory machine readable medium of claim 17, wherein the compact matrix comprises an adjacency matrix.

20. The non-transitory machine readable medium of claim 17, wherein:
the decision tree structure specifies a parent-child relationship among the plurality of nodes; and
the compact matrix is generated at least in part by mapping the parent-child relationship defined by the decision tree structure into a row-column structure of the compact matrix.

* * * * *